United States Patent
Kilian

(10) Patent No.: US 7,562,138 B2
(45) Date of Patent: Jul. 14, 2009

(54) SHARED MEMORY BASED MONITORING FOR APPLICATION SERVERS

(75) Inventor: Frank Kilian, Mannheim (DE)

(73) Assignee: SAP, Walldorf (DE)

( * ) Notice: Subject to any disclaimer, the term of this patent is extended or adjusted under 35 U.S.C. 154(b) by 707 days.

(21) Appl. No.: 11/024,392

(22) Filed: Dec. 28, 2004

(65) Prior Publication Data

US 2006/0143525 A1   Jun. 29, 2006

(51) Int. Cl.
 G06F 15/167 (2006.01)
 G06F 15/173 (2006.01)
(52) U.S. Cl. ............. 709/224; 709/213; 709/216; 709/223
(58) Field of Classification Search .......... 709/217, 709/223, 224, 311; 711/1; 718/1
 See application file for complete search history.

(56) References Cited

U.S. PATENT DOCUMENTS

| | | | |
|---|---|---|---|
| 5,682,328 A | 10/1997 | Roeber et al. | |
| 5,905,868 A | 5/1999 | Baghai et al. | |
| 5,909,540 A | 6/1999 | Carter et al. | |
| 5,951,643 A | 9/1999 | Shelton et al. | |
| 6,467,052 B1 | 10/2002 | Kaler et al. | |
| 6,795,856 B1 | 9/2004 | Bunch | |
| 7,124,170 B1 | 10/2006 | Sibert | |
| 7,155,512 B2 | 12/2006 | Lean et al. | |
| 7,194,761 B1 | 3/2007 | Champagne | |
| 7,237,140 B2 | 6/2007 | Nakamura et al. | |
| 7,296,267 B2 | 11/2007 | Cota-Robles et al. | |
| 7,302,423 B2 | 11/2007 | De Bellis | |
| 7,418,560 B2 | 8/2008 | Wintergerst | |
| 2002/0078060 A1 | 6/2002 | Garst et al. | |
| 2002/0083166 A1* | 6/2002 | Dugan et al. ........... | 709/223 |
| 2003/0009533 A1* | 1/2003 | Shuster ................. | 709/217 |
| 2003/0014521 A1 | 1/2003 | Elson et al. | |
| 2003/0028671 A1 | 2/2003 | Mehta et al. | |
| 2003/0084248 A1 | 5/2003 | Gaither et al. | |
| 2003/0088604 A1* | 5/2003 | Kuck et al. ............ | 709/311 |
| 2003/0097360 A1 | 5/2003 | McGuire et al. | |
| 2003/0131286 A1 | 7/2003 | Kaler et al. | |
| 2003/0177382 A1 | 9/2003 | Ofek et al. | |
| 2003/0212654 A1 | 11/2003 | Harper et al. | |
| 2004/0024971 A1 | 2/2004 | Bogin et al. | |
| 2004/0181537 A1 | 9/2004 | Chawla et al. | |
| 2005/0044301 A1* | 2/2005 | Vasilevsky et al. ...... | 711/1 |
| 2005/0060704 A1* | 3/2005 | Bulson et al. .......... | 718/1 |
| 2005/0278346 A1 | 12/2005 | Shang et al. | |
| 2006/0053112 A1 | 3/2006 | Chitkara et al. | |
| 2006/0206856 A1 | 9/2006 | Breeden et al. | |
| 2007/0266305 A1 | 11/2007 | Cong et al. | |

OTHER PUBLICATIONS

EP 05027361, European Search Report, (Mar. 28, 2006).

(Continued)

*Primary Examiner*—Quang N. Nguyen
(74) *Attorney, Agent, or Firm*—Schwegman, Lundberg & Woessner, P.A.

(57) ABSTRACT

A system and method to monitor application servers using shared monitoring memory. An application server includes worker nodes having Java virtual machines to process work requests received by the application server. Status information is generated for each of the worker nodes while processing the work requests. The status information for each of the worker nodes is then stored into the shared monitoring memory while the worker nodes operate.

13 Claims, 5 Drawing Sheets

OTHER PUBLICATIONS

"FOA Mailed Aug. 17, 2007 for U.S. Appl. No. 11/013,277", Whole Document.
"OA Mailed Jan. 7, 2008 for U.S. Appl. No. 11/013,277", Whole Document.
"OA Mailed Mar. 12, 2007 for U.S. Appl. No. 11/013,277", Whole Document.
"FOA Mailed Aug. 17, 2007 for U.S. Appl. No. 11/013,278", Whole Document.
"OA Mailed Feb. 5, 2008 for U.S. Appl. No. 11/013,278", Whole Document.
"OA Mailed Mar. 16, 2007 for U.S. Appl. No. 11/013,278", Whole Document.
"FOA Mailed Aug. 28, 2007 for U.S. Appl. No. 11/012,803", Whole Document.
"OA Mailed Jan. 24, 2008 for U.S. Appl. No. 11/012,803", Whole Document.
"OA Mailed Mar. 16, 2007 for U.S. Appl. No. 11/012,803", Whole Document.
"OA Mailed Jan. 24, 2008 for U.S. Appl. No. 11/024,393", Whole Document.
"FOA Mailed Dec. 11, 2007 for U.S. Appl. No. 11/118,259", Whole Document.
"OA Mailed Apr. 4, 2008 for U.S. Appl. No. 11/118,259", Whole Document.
"OA Mailed Jun. 11, 2007 for U.S. Appl. No. 11/118,259", Whole Document.
"FOA Mailed Aug. 13, 2008 for U.S. Appl. No. 11/013,278, Whole Document".
Galchev, Galin, et al., "Plug-In Based Caching Architecture Capable Of Implementing Multiple Cache Regions Per Application", U.S. Appl. No. 11/024,554, filed Dec. 28, 2004.
Galchev, Galin, "Plug-In Based Caching Architecture Capable of Implementing Multiple Cache Regions per Application", U.S. Appl. No. 11/024,554, filed Dec. 28, 2004—Non-Final Office Action mailed May 28, 2008, 7 pgs.
Petev, Petio, et al., "Common Cache Management in a Plurality of Virtual Machines", U.S. Appl. No. 11/025,482, filed Dec. 28, 2004.
Petev, Petio, et al., "First In First Out Eviction Implementation", U.S. Appl. No. 11/024,546, filed Dec. 28, 2004.
Petev, Petio G., et al., "Programming Models for Storage Plug-ins", U.S. Appl. No. 11/024,651, filed Dec. 28, 2004.
Petev, Petio, et al., "Size Based Eviction Implementation", U.S. Appl. No. 11/024,591, filed Dec. 28, 2004.
USPTO, "OA Mailed Jun. 27, 2008 for U.S. Appl. No. 11/024,391", Whole Document.
USPTO, "FOA Mailed Aug. 6, 2008 for U.S. Appl. No. 11/024,393", Whole Document.
Wintergerst, Michael, "Storage Plugin Based on Shared Closures", U.S. Appl. No. 11/024,613, filed Dec. 28, 2004.
Non-Final Office Action for U.S. Appl. No. 11/024,393 Mailed Nov. 26, 2008, 29 pages.
Non-Final Office Action for U.S. Appl. No. 11/013,278, Mailed Dec. 23, 2008, 28 pages.
Non-Final Office Action for U.S. Appl. No. 11/012,803, Mailed Dec. 23, 2008, 22 pages.
Cheung, KC, et al., "Lightweight Trace and Interpreter for Interprocess Timing Problems", IP.Com Journal, IP.Com Inc., West Henrietta, NY US, XP013096988, ISSN: 1533-0001, (Jun. 1, 1992), Whole Document.
EPO, "EP Search Report Mailed Jun. 4, 2008 for EP Patent Application 05027365.5-1225", Whole Document.
Viswanathan, D., et al., "Java Virtual Machine Profiler Interface", *IBM Systems Journal IBM* USA, vol. 39, No. 1, XP002481425, ISSN: 0018-8670, (2000), 82-95.
Wolczko, Mario, "Using a Tracing Java Virtual Machine to Gather Data on the Behavior of Java Programs", *Internet Citation*, XP002375976, http://research.sun.com/people/mario/tracing-jvm/tracing.pdf, (Retrieved on Apr. 6, 2006), Whole Document.

\* cited by examiner

SHARED MEMORY BASED MONITORING FOR APPLICATION SERVERS

TECHNICAL FIELD

This disclosure relates generally to application servers, and in particular but not exclusively, relates to monitoring application servers using shared memory.

BACKGROUND INFORMATION

Enterprise software has transformed the way diverse enterprises, large and small a like, transact and manage day-to-day operations. Businesses use enterprise software (e.g., web based application servers) to control production planning, purchasing and logistics, warehouse and inventory management, production, vendor management, customer service, finance, personnel management, and other basic business activities. As the enterprise software industry continues to mature, the various application and hardware resources enlisted to facilitate this diverse set of tasks are being amalgamated into robust, highly integrated solutions (e.g., SAP NetWeaver, SAP xAPPs, mySAP Business Suite, etc.).

To integrate diverse hardware and software resources, developers of enterprise software have leveraged cross platform engines capable of minimizing or even severing platform dependencies from the enterprise solution. The Java 2 Platform, Enterprise Edition™ ("J2EE") (e.g., J2EE Specification, Version 1.4) is a Java based solution supported by the Java Virtual Machine ("JVM") engine. J2EE simplifies application development and decreases the need for programming and programmer training by creating standardized and reusable modular components. The popularity of Java based solutions is evident as the Information Technology ("IT") world has gravitated to the Java language.

As enterprise software is woven into the fabric of modern business, failure of an enterprise solution may no longer be a mere nuisance, but has the potential to wreak catastrophic havoc on a business. As such, robust, reliable software is evermore critical. The enterprise software industry is marching toward the ultimate goal of self-healing software capable of sustainable, uninterrupted operation, without human intervention. In pursuit of this goal, IT technicians can benefit from convenient tools capable of monitoring the health of their enterprise software. With appropriate monitoring tools, IT technicians can take appropriate action in a timely manner to ensure a healthful state of their software or to spot delinquent applications and prevent repeat offenders. Currently, JVMs do not provide adequate mechanisms to monitor their internal operation on a real-time basis.

SUMMARY OF INVENTION

A system and method to monitor application servers using shared monitoring memory. An application server includes worker nodes having Java virtual machines to process work requests received by the application server. Status information is generated for each of the worker nodes while processing the work requests. The status information for each of the worker nodes is then stored into the shared monitoring memory while the worker nodes operate.

In one embodiment, if a worker node is terminated, the status information corresponding to the terminated worker node is copied into a log file from the shared monitoring memory. Once the log file is generated, portions of the shared monitoring memory occupied by the status information corresponding to the terminated worker node are reclaimed.

In one embodiment, the status information is retrieved from the shared monitoring memory and transmitted to a management console to display the status information.

Embodiments of the invention may include all or some of the above described features. The above features can be implemented using a computer program, a method, a system or apparatus, or any combination of computer programs, methods, or systems. These and other details of one or more embodiments of the invention are set forth in the accompanying drawings and in the description below.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
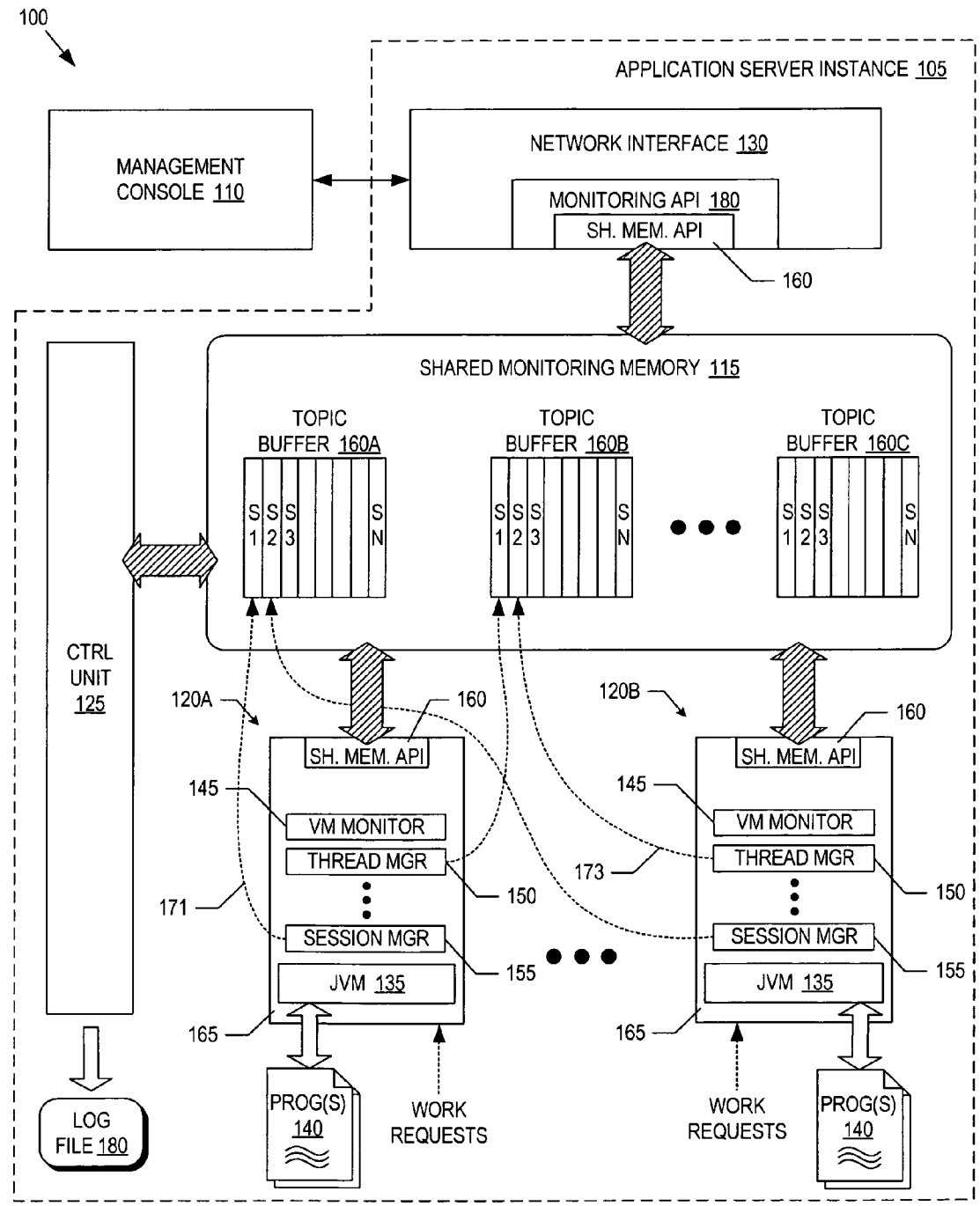
FIG. 1 is a block diagram illustrating a system for monitoring an application server using shared monitoring memory, in accordance with an embodiment of the invention.

FIG. 1 is a block diagram illustrating a system 100 for monitoring an application server using shared monitoring memory, in accordance with an embodiment of the invention. The illustrated embodiment of system 100 includes an application server ("AS") instance 105 and a management console 110. The illustrated embodiment of AS instance 105 includes shared monitoring memory 115, worker nodes 120A and 120B (collectively 120), a control unit 125, and a network interface 130. In one embodiment, AS instance 105 represents a Java 2 Platform, Enterprise Edition ("J2EE") instance for providing enterprise software functionality. In a J2EE environment, control unit 125 is often referred to as "Jcontrol" and network interface 130 may be implemented with a WebService Based Start Service.

In the illustrated embodiment, worker nodes 120 each include a Java virtual machine ("JVM") 135, one or more internal managers/monitors (e.g., a virtual machine ("VM") monitor 145, a thread manager 150, and a session manager 155), and a shared memory application programming interface ("API") 160 all supported within a native wrapper 165. JVMs 135 interpret and execute Java programs 140 while servicing work requests assigned to the particular worker node 120. Although FIG. 1 illustrates only two worker nodes 120 within AS instance 105, more or less worker nodes 120 may be established within AS instance 105 to service the work requests.

During operation of worker nodes 120, the internal managers/monitors (e.g., VM monitor 145, thread manager 150, session manager 155, etc.) update shared monitoring memory 115 with status information. In one embodiment, the status information is logically organized into topic buffers 160A, 160B, and 160C (collectively 160) containing topically related status information from each of worker nodes 120. Each topic buffer 160 may include multiple slots S1-SN, each holding the topically related status information from a respective one of worker nodes 120. Once the status information is stored into shared monitoring memory 115, the status information may be retrieved from shared monitoring memory 115 by network interface 130 and transmitted to management console 110 for display thereon. Using management console 110, an information technology ("IT") technician can remotely monitor the operational health of AS instance 105 in real-time to ensure AS instance 105 remains in a healthful state. Shared monitoring memory 115 working in concert with management console 110, enables the IT technician to make informed decisions when taking preventative and/or remedial action to effectively maintain and manage an enterprise system.

JVMs 135 interpret Java programs 140 by converting them from an intermediate interpreted language (e.g., Java bytecode) into a native machine language, which is then executed. Java programs 140 may be interpreted and executed by JVMs 135 to provide the business, presentation, and integration logic necessary to process the work requests received at AS instance 105. As the work requests are serviced, sessions are setup and taken down, threads assigned, and memory and processor cycles consumed. Shared monitoring memory 115 provides a mechanism by which these operational characteristics of worker nodes 120, as well as others, may be monitored.

VM monitor 145, thread manager 150, and session manager 155 are generators of status information describing the operational status of various aspects of worker nodes 120. Although only three such generators are illustrated in FIG. 1, it should be appreciated that worker nodes 120 may include any number of generators of status information to monitor various aspects of worker nodes 120. In many cases, these generators of status information are event based, rather than polled. As such, shared monitoring memory 115 is updated with status information as it is generated, rather than shared monitoring memory 115 polling each worker node 120 for status information. For example, shared monitoring memory 115 may be updated each time a work request is assigned to a particular one of worker nodes 120, in response to session events, in response to thread events, and various other JVM 135 events. Event based updates are less processor intensive since they do not waste processor cycles querying for updates that do not yet exist. Furthermore, updates are more quickly published into shared monitoring memory 115 after the occurrence of an update event providing more up-to-date monitoring data.

Native wrapper 165 provides the runtime environment for JVM 135. In an embodiment where JVM 135 is a JVM compliant with the J2EE standard, native wrapper 165 is often referred to as "JLaunch." Native wrapper 165 is native machine code (e.g., compiled C++) executed and managed by an operating system ("OS") supporting AS instance 105. Once launched, native wrapper 165 establishes JVM 135 within itself. In one embodiment, the generators of status information (e.g., VM monitor 145, thread manager 150, session manager 155, etc.) are native code components of native wrapper 165. As such, even in the event of a failure of JVM 135, the generators of the status information can still operate providing updates on the failure status of the particular JVM 135. In other embodiments, a generator of status information may indeed be interpreted and executed on JVM 135, in which case a failure of JVM 135 would also terminate the particular generator.

While processing work requests, connections may be established between a client generating the work request and the particular worker node 120 servicing the work request. While the connection is maintained a session is established consisting of a series of interactions between the two communication end points (i.e., the worker node and the client). In one embodiment, session manager 155 is responsible for the overall managing and monitoring of these sessions, including setting up and taking down the sessions, generating session status information 171, and reporting session status information 171 to an appropriate one of topic buffers 160. For example, topic buffer 160A may be a "session buffer" assigned to store session related status information. In one embodiment, session manager 155 registers a different slot for each session currently open and active on its corresponding one of worker nodes 120.

As discussed above, Java programs 140 may be executed to provide the business, presentation, and integration logic necessary to process the work requests. During execution of Java programs 140, a thread may be assigned to act as a placeholder of information associated with each use of Java programs 140, thereby handling multiple concurrent users/clients. If one of Java programs 140 initiates an input/output ("I/O") request, such as accessing a database, a thread may be assigned to the particular Java program 140. Data kept as part of a thread allows the particular Java program 140 to be reentered at the right place when the I/O operation complete. A pool of threads may be maintained and made available within each worker node 120 for use by Java programs 140 executing on the particular worker node 120. In one embodiment, this pool of threads and the threads themselves are managed by thread manager 150. In one embodiment, thread manager 150 generates thread status information 173 and reports thread status information 173 to an appropriate topic buffer 160. For example, topic buffer 160B may be a "thread buffer" assigned to store thread related status information. In one embodiment, thread manager 150 registers a different slot for each active thread on its corresponding one of worker nodes 120.

VM monitor 145 may monitor various internal activities of JVM 135. For example, VM monitor 145 may monitor the work load of JVM 135 and report overload situations into shared monitoring memory 115. VM monitor 145 may further monitor an internal heap of JVM 135 and report memory scarce situations into shared monitoring memory 115. VM monitor 145 may even monitor garbage collecting activity within JVM 135 and report over active garbage collecting situations into shared monitoring memory 115. It should be appreciated that any aspect of worker nodes 120 capable of monitoring may be monitored by a generator of status information and the status information copied into a relevant topic buffer 160 and associated slots S1-SN.

The generators of the status information (e.g., session manager 155, thread manager 150, VM monitor 145, etc.) access shared monitoring memory 115 via shared memory API 160. In one embodiment, shared memory API 160 abstracts access to shared monitoring memory 115 through use of function calls. Each generator of status information that wishes to copy status information into shared monitoring memory 115 makes a "call" to one or more functions published internally to worker nodes 120 by shared memory APIs 160. The generator then passes the generated status information to the called function. In turn, the called function copies the status information into the appropriate slots and topic buffers 160.

In one embodiment, shared monitoring memory 115 is a portion of system memory pre-reserved to store status information. Abstracting access to shared monitoring memory 115 with shared memory APIs 160 insulates and protects the contents of shared monitoring memory 115 from each worker node 120. Should a worker node 120 crash, enter an infinite loop, or otherwise fail, the status information saved into shared monitoring memory 115 may still be protected and preserved from corruption.

Figure 2:
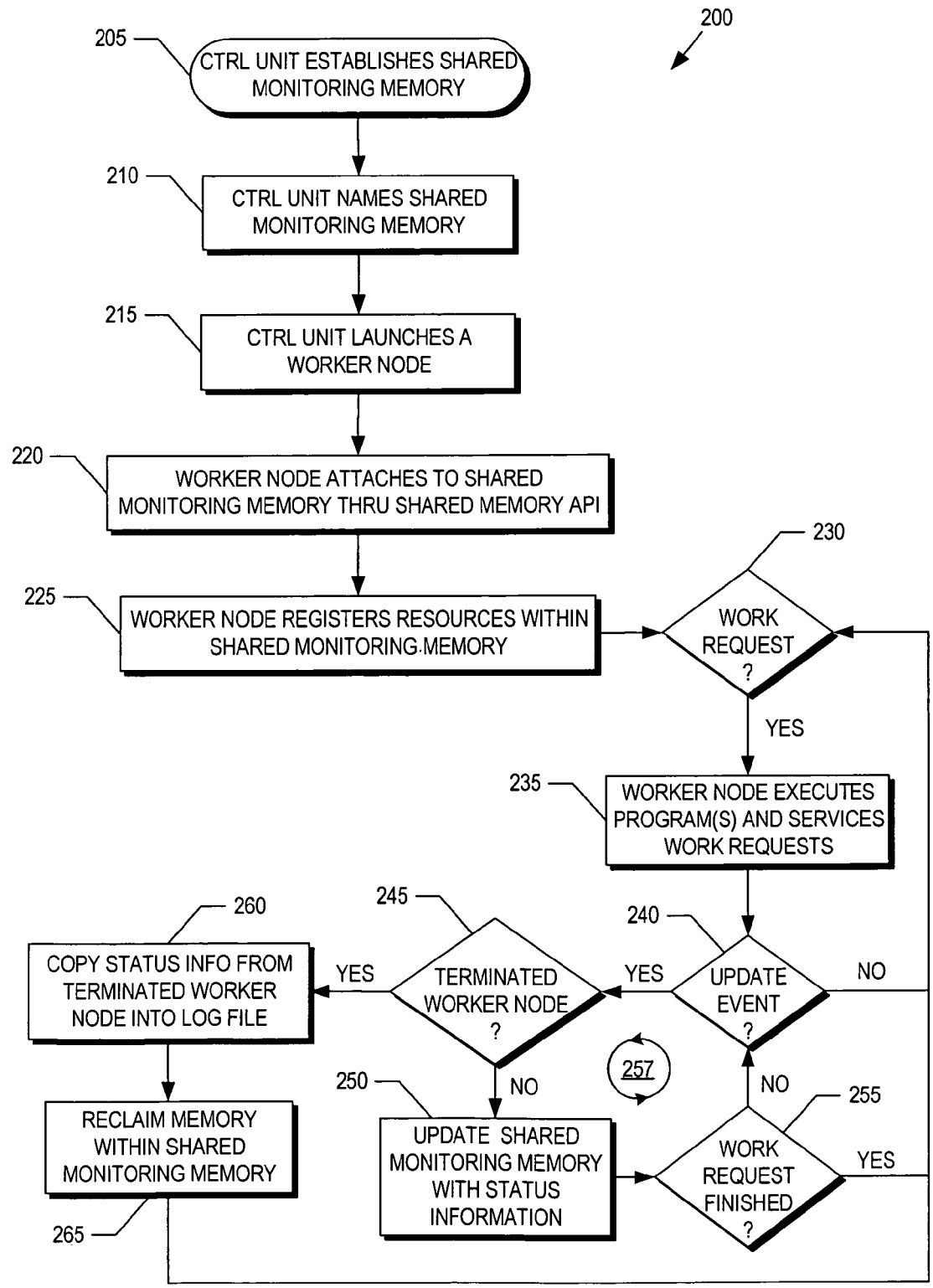
FIG. 2 is a flow chart illustrating a process to establish shared monitoring memory within an application server and use the shared monitoring memory to monitor the application server, in accordance with an embodiment of the invention.

FIG. 2 is a flow chart illustrating a process 200 to establish and use shared monitoring memory 115 to monitor the operation of AS instance 105, in accordance with an embodiment of the invention. In a process block 205, control unit 125 reserves and allocated portions of system memory to establish shared monitoring memory 115. In a process block 210, control unit 125 names shared monitoring memory 115.

Once shared monitoring memory 115 is established and named, control unit 125 launches each of worker nodes 120. Control unit 125 is responsible for the life cycles of worker nodes 120. Control unit 125 can launch a new worker node 120, terminate an existing worker node 120 at an end of its useful life cycle, or restart a hung, or otherwise problematic, worker node 120.

After each worker node 120 is established, the worker node 120 attaches to shared monitoring memory 115 via shared memory API 160 (process block 220) and register its resources within shared monitoring memory 115 (process block 225). Registering resources may include registering a slot for each session and thread, registering the number of Java objects stored within an internal heap of the worker node, registering available memory within the heap, and the like. In one embodiment, the first worker node 120 to register within shared monitoring memory 115 may create topic buffers 160 to store its status information. Subsequent worker nodes 120 simply register a new slot within the existing topic buffers 160. In an alternative embodiment, control unit 125 creates topic buffers 160 when shared monitoring memory 115 is initially established.

Once worker nodes 120 have registered their initial resources within shared monitoring memory 115, worker nodes 120 are ready to receive and process work requests. Work requests are tasks to be performed and are assigned to the individual worker nodes 120 by a dispatcher or other load balancing mechanism. The tasks may be as simple as a request to retrieve data from a database to performing complex computations on the data retrieved from the database, and formatting the computational results for display on a client. If a request is received by one of worker nodes 120 (decision block 230), process 200 continues to a process block 235.

In process block 235, the designated worker nodes 120 services the work request. In most cases, servicing a work request requires JVM 135 to execute one or more Java programs 140 providing the logic necessary to carry out the requested task. While executing Java programs 140, one or more update events may occur (decision block 240). Update events are events that occur during operation of worker nodes 120 deemed important enough to report into shared monitoring memory 115 for the purpose of monitoring worker nodes 120. In the example of session manager 155, update events may include the creation of a new session and the termination of an existing session.

In a decision block 245, if the update event is not a terminated worker node 120, then process 200 continues to a process block 250. In process block 250, status information regarding the update event is reported into shared monitoring memory 115 within the appropriate topic buffer 160 and slot S1-SN, as discussed above. Multiple update events may occur during the course of servicing a single work request. As such, process 200 may loop around loop 257 a number of times before the current work request is complete (decision block 255). Once servicing a work request is complete, process 200 returns to decision block 230 to wait for the next work request.

Returning to decision block 245, if the update event is a termination of one of worker nodes 120, then process 200 continues to a process block 260. In process block 260, status information currently stored within shared monitoring memory 115 relating to the terminated one of worker nodes 120 is copied into a log file 180 by control unit 125. In one embodiment, control unit 125 may include final status information (e.g., termination time, termination reason, etc.) within log file 180. In a process block 265, control unit 125 reclaims the portions of shared monitoring memory 115 consumed by the status information relating to the terminated one of worker nodes 120 for future use by other ones of worker nodes 120.

Figure 3:
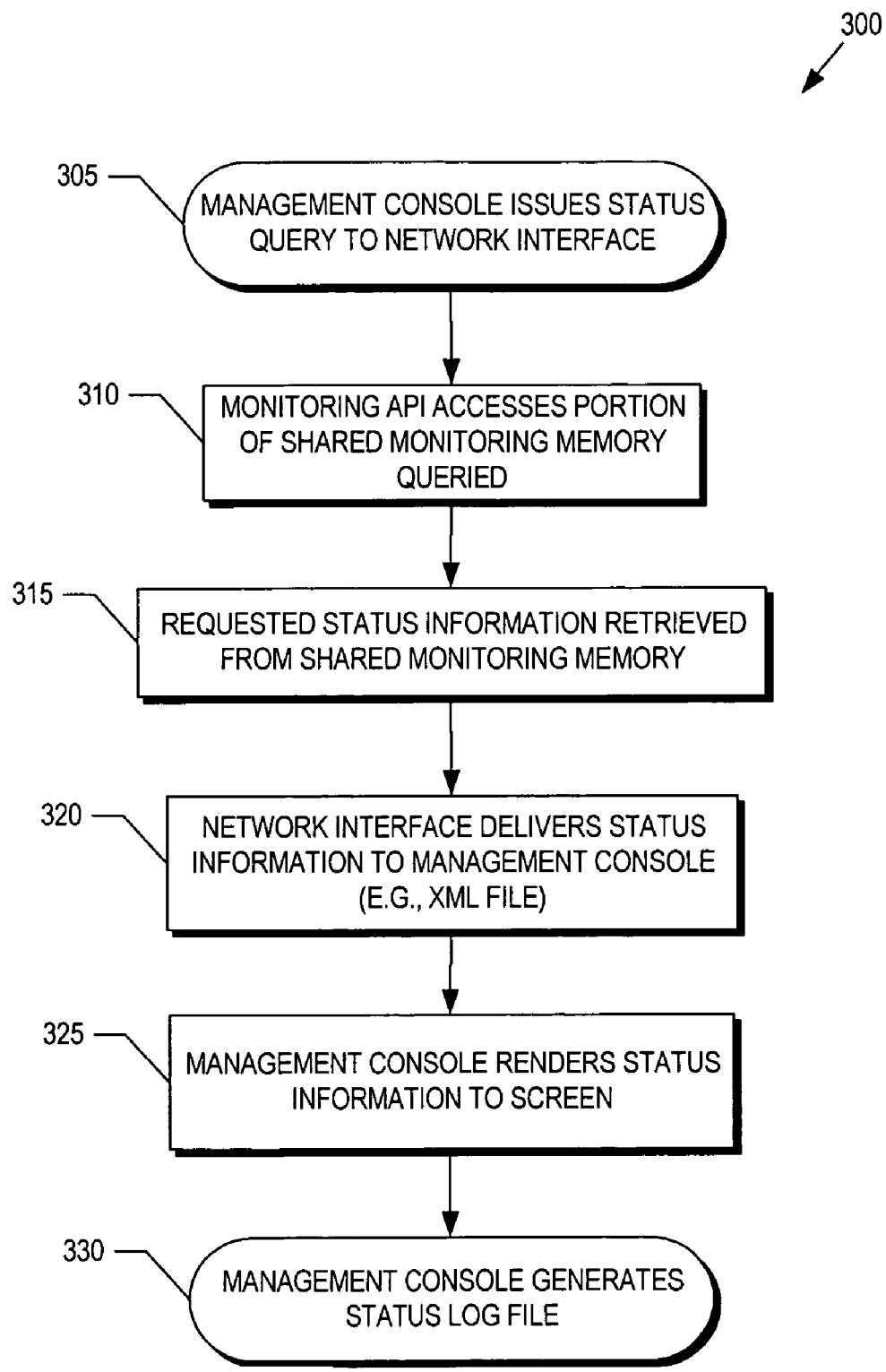
FIG. 3 is a flow chart illustrating a process to obtain status information from shared monitoring memory of an application server and display the status information on a management console, in accordance with an embodiment of the invention.

FIG. 3 is a flow chart illustrating a process 300 to obtain status information from shared monitoring memory 115 and display the status information on management console 110, in accordance with an embodiment of the invention. In a process block 305, management console 110 transmits a status query to network interface 130 of AS instance 105. Management console 110 can be implemented using the Microsoft Management Console ("MMC"), while network interface 130 may be implemented with a WebService based Start Service. In one embodiment, the status queries are conveyed to network interface 130 using a message based protocol, such as Simple Object Access Protocol ("SOAP") employing extensible markup language ("XML") syntax to send text commands over the HyperText Transport Protocol ("HTTP"). The status query may be transmitted to AS instance 105 automatically on a periodic basis, in response to a specified event, or in response to a screen refresh request by an IT technician.

Upon receipt, the status query is passed to a monitoring API 190. Monitoring API 190 accesses the requested portions of shared monitoring memory 115 via shared memory API 160 (process block 310). In a process block 315, monitoring API 190 retrieves the requested portions of the status information from shared monitoring memory 115. Once retrieved, monitoring API 190 may use XML syntax to convey the retrieved status information back to management console 110 (process block 320).

In a process block 325, management console 110 formats the received status information and renders it to a screen for review by an IT technician. Management console 110 may display status information received from a number AS instances 105 to monitor an entire cluster of AS instances 105. Management console 110 may further optionally generate log files to maintain long-term status reports on each AS instance 105 being monitored (process block 330).

In addition to issuing status requests, management console 110 may negotiate a reporting contract with network interface 130 to serve up the status information on a regular or periodic basis, without need of status requests. As such, network interface 130 may be capable of pushing the status information to management console 110, as well as, management console 110 pulling the status information from network interface 130.

Figure 4:
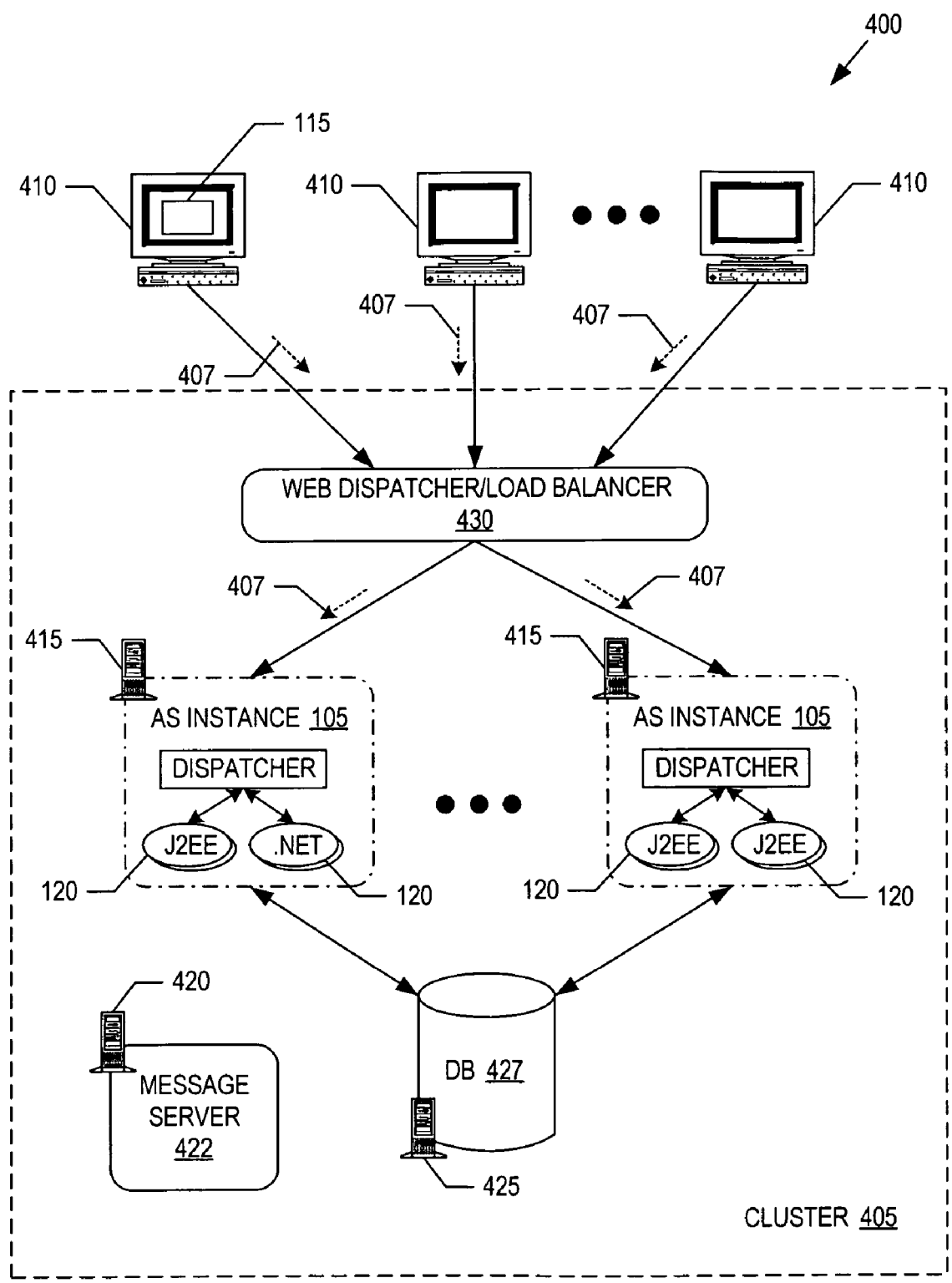
FIG. 4 is a block diagram illustrating a demonstrative enterprise environment for implementing embodiments of the invention.

FIG. 4 is a block diagram illustrating a demonstrative enterprise environment 400 for implementing embodiments of the invention. The illustrated embodiment of enterprise environment 400 includes a cluster 405 coupled to service work requests 407 from client nodes 410. Cluster 405 may include one or more server nodes 415 each supporting one or more AS instances 105, a message server node 420 supporting a message server 422, a database node 425 supporting a database 427, and a web dispatcher 430.

AS instances 105 may be web application servers, such as Web AS by SAP, .NET by Microsoft, or the like. As discussed above, each AS instance 105 may include one or more worker nodes 120 to execute Java programs 140 and service work requests 407. It should be appreciated that various components of AS instances 105 have been excluded from FIG. 4 for the sake of clarity and so as not to obscure the invention. In one embodiment, worker nodes 120 may be compliant with the J2EE standard. In one embodiment, worker nodes 120 may be compliant with the .NET framework from Microsoft. Each AS instance 105 may even include worker nodes 120 compliant with both the J2EE standard and the .NET framework.

Web dispatcher 430 implements a load-balancing mechanism distributing work requests 407 from client nodes 410 among server nodes 415 within cluster 405. For example, web dispatcher 430 may implement a round-robin load-balancing mechanism or the like. Web dispatcher 430 may be one of server nodes 415 having the task of dispatching work requests 407 among server nodes 415 of cluster 405 or a stand alone hardware node. Work requests 407 are processed by server nodes 415 and may subsequently be provided to database node 425. Database node 425 offers up the requested data to server nodes 415, which in turn process and format the results for display on client nodes 410. Each AS instance 105 may further include its own dispatcher mechanism to distribute work requests 407 assigned to it among its individual worker nodes 120.

Java programs 140 (see FIG. 1) executed by worker nodes 120 within AS instances 105 may collectively provide the logic for implementing various sub-layers (e.g., business layer, integration layer, presentation layer, etc.) of AS instances 105. For example, Java programs 140 may be servlets providing server-side logic to generate graphical user interfaces ("GUIs") on clients nodes 410 and may further include JavaServer Page ("JSP") extensions for providing dynamic content within the GUI. Java programs 140 may further include business applications providing the business logic of an Enterprise JavaBean ("EJB"), and on client nodes 410 may be applets providing client side logic, and the like.

One of client nodes 410 may execute management console 110 to provide remote monitoring of AS instances 105, and in particular, remote monitoring of each worker node 120. If an IT technician notices that one of the worker nodes 120 is overloaded with work requests 407, has scarce available memory, or the like, the IT technician can take appropriate action including resetting the problematic worker node 120.

Figure 5:
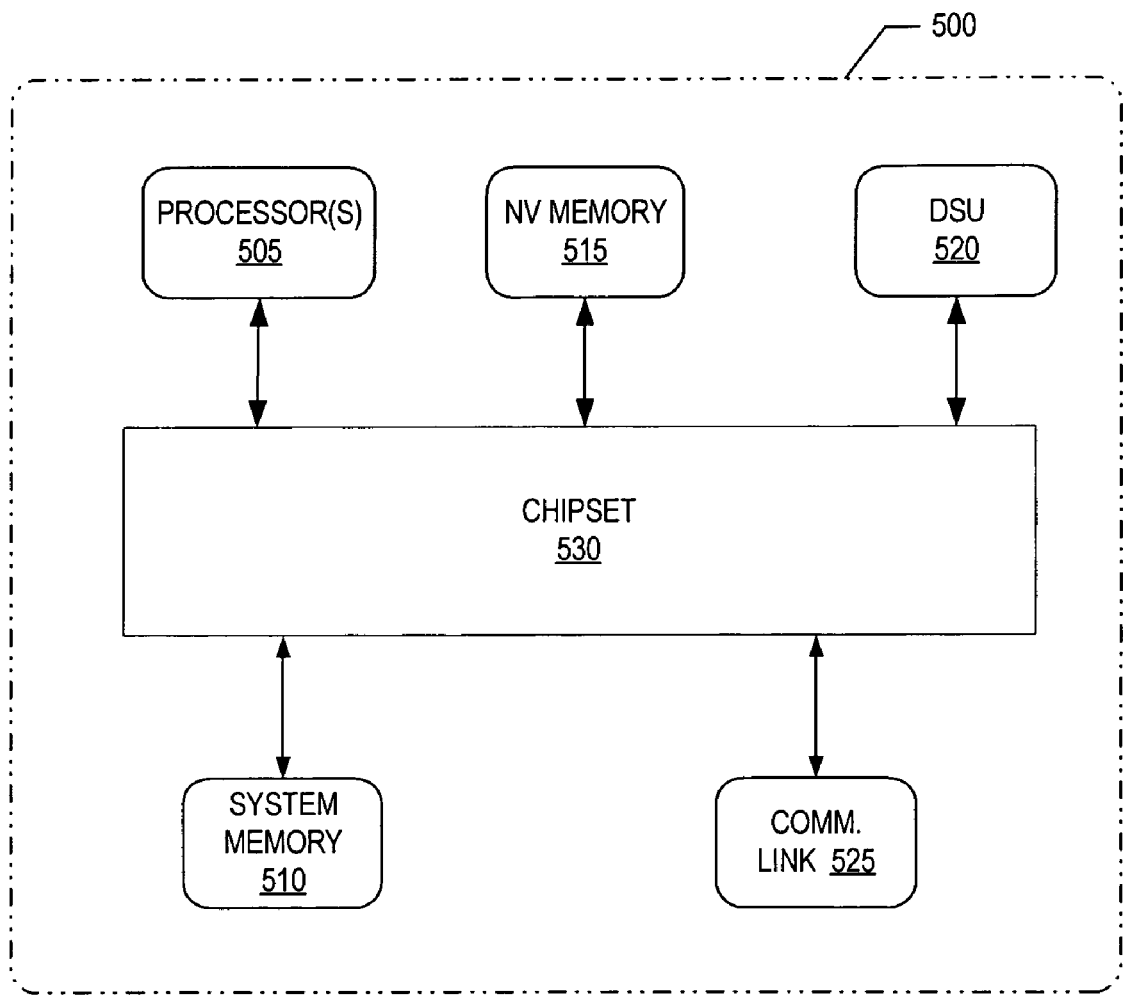
FIG. 5 illustrates a demonstrative processing system for implementing embodiments of the invention.

FIG. 5 is a block diagram illustrating a demonstrative processing system 500 for executing any of AS instance 105, management console 110, processes 200 and 300, or implementing any of client nodes 410, server nodes 415, message server node 420, or database node 425. The illustrated embodiment of processing system 500 includes one or more processors (or central processing units) 505, system memory 510, nonvolatile ("NV") memory 515, a DSU 520, a communication link 525, and a chipset 530. The illustrated processing system 500 may represent any computing system including a desktop computer, a notebook computer, a workstation, a handheld computer, a server, a blade server, or the like.

The elements of processing system 500 are interconnected as follows. Processor(s) 505 is communicatively coupled to system memory 510, NV memory 515, DSU 520, and communication link 525, via chipset 530 to send and to receive instructions or data thereto/therefrom. In one embodiment, NV memory 515 is a flash memory device. In other embodiments, NV memory 515 includes any one of read only memory ("ROM"), programmable ROM, erasable programmable ROM, electrically erasable programmable ROM, or the like. In one embodiment, system memory 510 includes random access memory ("RAM"), such as dynamic RAM ("DRAM"), synchronous DRAM, ("SDRAM"), double data rate SDRAM ("DDR SDRAM") static RAM ("SRAM"), and the like. DSU 520 represents any storage device for software data, applications, and/or operating systems, but will most typically be a nonvolatile storage device. DSU 520 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 520 is illustrated as internal to processing system 500, DSU 520 may be externally coupled to processing system 500. Communication link 525 may couple processing system 500 to a network such that processing system 500 may communicate over the network with one or more other computers. Communication link 525 may include a modem, an Ethernet card, a Gigabit Ethernet card, Universal Serial Bus ("USB") port, a wireless network interface card, a fiber optic interface, or the like.

It should be appreciated that various other elements of processing system 500 have been excluded from FIG. 5 and this discussion for the purposes of clarity. For example, processing system 500 may further include a graphics card, additional DSUs, other persistent data storage devices (e.g., tape drive), and the like. Chipset 530 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 530. Correspondingly, processing system 500 may operate without one or more of the elements illustrated. For example, processing system 500 need not include DSU 520.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Processes 200 and 300 explained above are described in terms of computer software and hardware. The techniques described may constitute machine-executable instructions embodied within a machine (e.g., computer) readable medium, that when executed by a machine will cause the machine to perform the operations described. Additionally, processes 200 and 300 may be embodied within hardware, such as an application specific integrated circuit ("ASIC") or the like. The order in which some or all of the process blocks appear in processes 200 and 300 should not be deemed limiting. Rather, one of ordinary skill in the art having the benefit of the present disclosure will understand that some of the process blocks may be executed in a variety of orders not illustrated.

The above description of illustrated embodiments of the invention, including what is described in the Abstract, is not intended to be exhaustive or to limit the invention to the precise forms disclosed. In some examples above, well-known structures, materials, or operations are not shown or described in detail to avoid obscuring certain aspects. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    launching with a control unit of an application server ("AS") instance at least two worker nodes within the AS instance, each of the launched worker nodes including a native wrapper providing a runtime environment, wherein each of the native wrappers includes one or more status information generators including a virtual machine ("VM") monitor;
    for each of the at least two worker nodes,
        establishing in the runtime environment provided by the native wrapper of the worker node a respective Java virtual machine ("JVM"), wherein each of the one or more status information generators of the native wrapper is a native code component of the native wrapper external to the JVM,
        each of the one or more status information generators of the worker node registering a slot in a different respective topic buffer of a plurality of topic buffers in a shared monitoring memory of the AS instance, wherein each of the topic buffers is assigned to storing status information of a particular type, and wherein each of the at least two worker nodes, the control unit and a network interface of the AS instance can access the shared monitoring memory with a function call of the shared memory API,
        processing by the JVM a work request received by the AS instance, and
        during the processing the work request, the one or more status information generators calling a function of a shared memory application programming interface ("API"), wherein the function stores in one of the registered slots of the shared monitoring memory information describing an operational status of the worker node;
    the network interface of the AS instance retrieving via the shared memory API information stored in the shared monitoring memory by the status information generators of the at least two worker nodes; and
    the network interface of the AS instance transmitting the retrieved information for display by a management console.

2. The method of claim 1, wherein the topic buffers include a session buffer to store session information related to sessions active on each of the worker nodes, each slot within the session buffer corresponding to a different one of the sessions.

3. The method of claim 1, wherein the topic buffers include a thread buffer to store thread information related to threads active on each of the worker nodes, each slot within the thread buffer corresponding to a different one of the threads.

4. The method of claim 1, wherein the topic buffers include a virtual machine ("VM") buffer to store general information related to internal operation of each of the JVMs within each of the worker nodes, each slot within the VM buffer corresponding to a different one of the worker nodes.

5. The method of claim 1, further comprising:
    terminating one of the worker nodes; and
    in response to the terminating the one of the worker nodes,
        copying by the control unit of the AS instance the status information corresponding to the terminated one of the worker nodes into a log file, and
        reclaiming portions of the shared monitoring memory occupied by the status information corresponding to the terminated one of the worker nodes.

6. A machine-accessible storage medium that provides instructions that, if executed by a machine, will cause the machine to perform operations comprising:
    launching with a control unit of an application server ("AS") instance at least two worker nodes within the AS instance, each of the launched worker nodes including a native wrapper providing a runtime environment, wherein each of the native wrappers includes one or more status information generators including a virtual machine ("VM") monitor;
    for each of the at least two worker nodes,
        establishing in the runtime environment provided by the native wrapper of the worker node a respective Java virtual machine ("JVM"), wherein each of the one or more status information generators of the native wrapper is a native code component of the native wrapper external to the JVM,
        each of the one or more status information generators of the worker node registering a slot in a different respective topic buffer of a plurality of topic buffers in a shared monitoring memory of the AS instance, wherein each of the topic buffers is assigned to storing status information of a particular type, and wherein each of the at least two worker nodes, the control unit and a network interface of the AS instance can access the shared monitoring memory with a function call of the shared memory API,
        processing by the JVM a work request received by the AS instance, and
        during the processing the work request, the one or more status information generators calling a function of a shared memory application programming interface ("API"), wherein the function stores in one of the registered slots of the shared monitoring memory information describing an operational status of the worker node;
    the network interface of the AS instance retrieving via the shared memory API information stored in the shared monitoring memory by the status information generators of the at least two worker nodes; and
    the network interface of the AS instance transmitting the retrieved information for display by a management console.

7. The machine-accessible storage medium of claim 6, wherein the topic buffers include at least one of:
    a session buffer to store session information related to sessions active on each of the worker nodes, each slot within the session buffer corresponding to a different one of the sessions;
    a thread buffer to store thread information related to threads active on each of the worker nodes, each slot within the thread buffer corresponding to a different one of the threads; and
    a virtual machine ("VM") buffer to store VM information related to operation of each of the JVMs within each of the worker nodes, each slot within the VM buffer corresponding to a different one of the worker nodes.

8. The machine-accessible storage medium of claim 6, wherein the status information includes at least one of a scarce memory indication and work request overload indication.

9. The machine-accessible storage medium of claim 6, wherein calling a function of the shared memory API is event driven.

10. A system, comprising:
a server node to execute an application server ("AS") instance, the AS instance including logic executable by a processor of the server node to:
launch with a control unit of an application server ("AS") instance at least two worker nodes within the AS instance, each of the launched worker nodes including a native wrapper providing a runtime environment, wherein each of the native wrappers includes one or more status information generators including a virtual machine ("VM") monitor;
for each of the at least two worker nodes,
establish in the runtime environment provided by the native wrapper of the worker node a respective Java virtual machine ("JVM"), wherein each of the one or more status information generators of the native wrapper is a native code component of the native wrapper external to the JVM,
register, by each of the one or more status information generators of the worker node, a slot in a different respective topic buffer of a plurality of topic buffers in a shared monitoring memory of the AS instance, wherein each of the topic buffers is assigned to storing status information of a particular type, and wherein each of the at least two worker nodes, the control unit and a network interface of the AS instance can access the shared monitoring memory with a function call of the shared memory API,
process with the JVM a work request received by the AS instance, and
during the processing the work request, call with the one or more status information generators a function of a shared memory application programming interface ("API"), wherein the function stores in one of the registered slots of the shared monitoring memory information describing an operational status of the worker node;
retrieve by the network interface of the AS instance information stored in the shared monitoring memory by the status information generators of the at least two worker nodes, the retrieving via the shared memory API; and
transmitting the information retrieved by the network interface of the AS instance for display by a management console.

11. The system of claim 10, wherein calling a function of the shared memory API is event driven to store the status information into the shared monitoring memory in response to generating the status information.

12. The system of claim 10, wherein information describing an operational status of a worker node includes one of:
session information related to active work sessions on each of the worker nodes during execution of the work requests;
thread information related to active threads on each of the worker nodes during execution of the work requests; and
virtual machine information related to operation of the JVMs during execution of the work requests.

13. The system of claim 10, further comprising a client node to execute a management console, the management console including logic executable by a processor of the client node to:
send a status query to the server node;
receive the status information from the server node; and
display the status information.

* * * * *